US00RE36949E

United States Patent [19]

Tateno et al.

[11] E Patent Number: Re. 36,949

[45] Reissued Date of Patent: Nov. 7, 2000

[54] FLUID MACHINE HAVING SCREW ROTORS WITH A STRAIGHT PORTION TO BE CHUCKED

[75] Inventors: Masao Tateno; Koji Tomita, both of Tochigi, Japan

[73] Assignee: Tochigi Fuji Sangyo Kabushiki Kaisha, Tochigi-ken, Japan

[21] Appl. No.: 09/107,853

[22] Filed: Jun. 30, 1998

Related U.S. Patent Documents

Reissue of:

[64] Patent No.: 5,692,889
Issued: Dec. 2, 1997
Appl. No.: 08/700,655
Filed: Aug. 16, 1996

[30] Foreign Application Priority Data

Aug. 17, 1995 [JP] Japan ..... 7-209420
Feb. 9, 1996 [JP] Japan ..... 8-023968

[51] Int. Cl.[7] ..... F01C 1/16

[52] U.S. Cl. ..... 418/201.1; 29/888.023

[58] Field of Search ..... 418/197, 201.1, 418/201.3; 29/888.023

[56] References Cited

U.S. PATENT DOCUMENTS 2,325,617 8/1943 Lysholm et al. ..... 418/201.1
5,290,150 3/1994 Takahashi et al. ..... 418/201.1

FOREIGN PATENT DOCUMENTS 185926 6/1956 Australia ..... 418/201.3
523741 7/1940 United Kingdom ..... 418/201.3

*Primary Examiner*—John J. Vrablik
*Attorney, Agent, or Firm*—Howard & Howard

[57] ABSTRACT

A shaft hole 69 in a cast rotor main body 67 has a hollow space 75 and an opening 79 in a tooth trace 73 formed by using a core. A hollow screw rotor 35 is formed by fixing a rotor shaft 47 in this shaft hole 69. A straight portion 81 to be chucked at the time of machining is formed at the inner peripheral side of the opening 79.

11 Claims, 14 Drawing Sheets

FLUID MACHINE HAVING SCREW ROTORS WITH A STRAIGHT PORTION TO BE CHUCKED

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a fluid machine used, for example, in a supercharger of a vehicle.

2. Description of the Related Art

A rotor is disclosed in Japanese Laid-open Utility Model 63-198401, and a screw type compressor is disclosed in Japanese Laid-open Patent 4-311694.

The rotor is a male screw rotor for a screw type compressor, and includes a rotor shaft fixed to a rotor main body. The screw type compressor has mutually engaged male and female screw rotors, and each rotor includes a rotor shaft fixed to a rotor main body.

The conventional male screw compressor rotor is thick in tooth thickness and solid. Such rotors have a large moment of inertia. When a screw type compressor with a rotor having a large moment of inertia is used in a supercharger, the engine drive energy loss is large, the response in acceleration is poor, and a clutch for connecting and disconnecting the engine must be larger in size. Accordingly, in such rotors, hollow parts are formed in protrusions of the rotor main body to reduce the weight, and hence decrease the moment of inertia.

When processing a rotor main body without a hollow space by casting, the rotor shaft is fixed by the insert when casting the rotor main body. When processing a rotor main body by cutting, a shaft hole is drilled in a round bar of a larger diameter than a completed rotor. The rotor shaft is fixed in this shaft hole, and the rotor protrusion is machined on the outer circumference of the round bar. These solid rotors have little in misalignment between the center of rotation of the rotor main body and the rotor shaft.

In the case of a hollow rotor, on the other hand, a shaft hole is machine in the rotor main body, and the rotor shaft is fixed in this shaft hole. When machining the shaft hole, a proper position for chucking the rotor main body is necessary. However, in a hollow rotor, there is no chucking position other than the hollow space of the protrusion or the outer circumference of the rotor main body. Actually, there is no chucking place in the hollow space of the rotor. In the case of the rotor, the inner circumference of the hollow space is a curved surface, and an accurate plate for chucking is not prepared. If a shaft hole is machined by chucking such curved inner circumference, misalignment of rotor main body and rotor shaft is likely to occur.

When the outer circumference of the hollow rotor is chucked, the hollow protrusion is deformed by the clamping force of chucking, and this deformation causes misalignment of the shaft hole. Moreover, if the hollow rotor at the time of chucking has not yet had its protrusion formed, aside from the misalignment due to deformation, misalignment of the shaft hole due to forming of the protrusion is added, and a greater misalignment occurs.

In the case of casting the rotor main body and forming the hollow space by a core, the misalignment of the core and shaft hole deviates the balance of rotation substantially, and it needs a huge cost for correction of the balance.

SUMMARY OF THE INVENTION

It is hence a primary object of the invention to provide a fluid machine capable of aligning the rotor main body and rotor shaft precisely, while decreasing the moment of inertia. The invention includes a hollow structure in a rotor main body.

To achieve the object, the invention provides a fluid machine comprising:

a male rotor, composed of a rotor main body having plural screw-shaped protrusions, and a rotor shaft fixed in a shaft hole formed in the center of rotation thereof;

a female rotor, composed of a rotor main body having screw-shaped recesses formed between bulges to be engaged with protrusions of the male rotor, and a rotor shaft fixed in a shaft hole formed in the center of rotation thereof; and a casing notably mounting the male rotor and female rotor, and having a fluid inlet and outlet, wherein a hollow space having an opening at least at the axial end is provided in either one or both of the protrusions of the male rotor and bulges of the female rotor, and a straight portion for chucking at the time of machining is formed at the inner circumferential side of the opening.

In the fluid machine of the invention, the straight portion for chucking is formed at the opening inner side of the hollow space. Thus, by chucking the straight portion and machining a hole for rotor shaft, the rotor main body and the rotor shaft can be aligned precisely. Forming the protrusion (tooth profile) may be done either simultaneously with the shaft hole machining, or after fixing the rotor shaft in the shaft hole on the basis of the rotor shaft, so that a hollow rotor of adjusted rotation balance without misalignment may be obtained.

In this manner, by forming the hollow structure to reduce the weight and decrease the moment of inertia, a hollow rotor is obtained of excellent rotation balance without misalignment of the rotor main body and rotor shaft. Therefore, rotor balance correction is not necessary, or if necessary, only a very slight correction is necessary.

In this fluid machine, the hollow rotor is a screw rotor having screw-shaped protrusions. According to this fluid machine, a hollow rotor of excellent rotation balance without misalignment of rotor main body and rotor shaft is obtained.

Screw type fluid machines rotated at higher speed than the Roots type fluid machine using a cocoon-shaped section rotor, are susceptible to adverse effects such as vibration due to imbalance of rotation. Thus, the effect of this invention of obtaining a hollow rotor with an adjusted rotation balance is outstanding.

The rotor of the fluid machine may be processed by casting. As a result, the same effects as in the above fluid machine are obtained.

Further, in the constitution for processing the rotor by casting, if cast by any method, including a method of using sand pattern, lost form method, and lost wax method, a flat plane is obtained when casting the rotor. It is not necessary to machine the flat plane, so that it can be executed at lower cost. In this way, the flat plane as the standard for processing is obtained by casting, which is very convenient for processing the rotor after casting.

Besides, in the fluid machine, the hollow space is formed at least in one of the male rotor and female rotor, and a flat plane to be chucked at the time of machining may be formed near the opening of this hollow space which is opened to the rotor end. Such a fluid machine is different from the prior art, which uses laminate structure without a flat plane for chucking position due to a continuous curved surface, accurate positioning is possible by gripping the rotor by a chuck tool of the machine tool.

It is therefore possible to machine the rotor precisely, and for example by synchronizing the feed rate and the rotor rotating speed in the radial direction and axial direction of the tool of the machine, the outer circumferential shape of the screw rotor can be processed accurately. Therefore, the rotor surface and hollow space are machined in a uniform thickness. The shaft hole can be processed accurately without misalignment. In this way, a rotor of an extremely excellent rotation balance is obtained, imbalance in rotation can be suppressed, and vibration in rotation can be prevented.

Not being of laminate structure, moreover, it is free from deviation in the axial length and tooth profile due to fluctuations of gap or thickness of laminates. Product reliability is notably enhanced, and is also liberated from the huge processing cost of laminates, a tremendous number of parts, and enormous manpower for control.

The constitution of the invention of processing the outer circumferential shape accurately as mentioned above brings about particularly large effects in the screw type fluid machine generally having the rotor with protrusions of three leaves or more, having complicated shape of outer circumference, having a continuous curved shape in the hollow space, used at higher rotating speed than Roots type fluid machine, and susceptible to adverse effects such as vibration due to imbalance of rotation.

In a different preferred embodiment of the fluid machine, the flat plane may be formed vertically to the normal about the center of rotation of the rotor main body. As in the above fluid machine, by forming the flat plane for chucking at the time of machining near the opening of the hollow space of the rotor main body, the rotor main body can be positioned accurately, and machined precisely. The tooth surface of the rotor may also be machined accurately, and a rotor of an extremely excellent balance of rotation is obtained. Unlike the prior art, there is no deviation in the axial length and tooth profile, the reliability of product is notably enhanced, it is liberated from the huge processing cost of laminates, a tremendous number of parts, and enormous manpower for control.

In addition, since the flat plane for chucking is formed vertically to the normal about the center of rotation of the rotor main body, the rotor positioning precision and processing precision are enhanced, and the vibration preventive effect and reliability improving effect of the fluid machine are further upgraded.

The flat plane may be formed in the side (bottom) of the rotation center side of the hollow space. In this case, too, the same effects as in the above fluid machine are obtained.

Since a surface close to a flat plane is initially formed, by forming this flat plane at the bottom side of the rotation center side, the flat plane may be formed sufficiently widely. Therefore, by securely chucking the wide flat plane, the rotor processing precision is improved further, vibration is better prevented and the reliability of the fluid machine is increased.

Moreover, having a straight portion at the rotation center side of the hollow space, a flat plane may be formed in the axial direction on the basis of this straight portion. As a result, the same effects as in the above fluid machine are obtained.

In addition, since the flat plane can be processed on the basis of the straight portion, the basis of processing is easily obtained, and processing of the flat plane is accurate, so that the rotor processing precision becomes much higher.

The rotor of the fluid machine may be processed by casting. As a result, the same effects as in the above fluid machine are obtained.

Further, when processing the rotor by casting, if cast by any method, including a method of using sand pattern, lost form method, and lost wax method, a flat plane is obtained when casting the rotor. It is not necessary to machine the flat plane, so that it can be executed at lower cost. In this way, the flat plane as the standard for processing is obtained by casting, which is very convenient for processing the rotor after casting.

In another aspect, the invention also provides a fluid machine comprising:

a male rotor, composed of a rotor main body having plural screw-shaped protrusions, and a rotor shaft fixed in a shaft hole formed in the center of rotation thereof;

a female rotor, composed of a rotor main body having screw-shaped recesses formed between bulges to be engaged with protrusions of the male rotor, and a rotor shaft fixed in a shaft hole formed in the center of rotation thereof; and a casing, rotatably mounting a male rotor and female rotor rotatably, and having fluid inlet and outlet, wherein a hollow space having an opening at least at the axial end is provided in either one or both of the protrusions of the male rotor and bulges of the female rotor, and a protruding portion for chucking at the time of machining is formed near the opening.

In this fluid machine, same as above, the rotor can be machined precisely. That is, the outer circumferential shape and shaft hole of the rotor can be processed precisely, while the rotor surface and hollow space can be processed in a uniform thickness. Moreover, by cutting off the protruding portion after processing the rotor, the balance of rotation can be adjusted. Therefore, the balance of rotation is extremely excellent, and occurrence of vibration during rotation can be prevented.

The protruding portion may be formed also at the side of center of rotation of the hollow space. As a result, the strength for chucking can be sufficiently maintained, and deformation of rotor due to chuck force or deformation in processing can be prevented. Hence, the balance of rotation after processing is superior.

The protruding portion may also possess a defining plane of rotating direction, a defining plane of radial direction, and a defining plane of axial direction for the rotor. Therefore, the rotor can be positioned accurately in each direction when chucking, and the processing precision is high. Hence, the balance of rotation after processing is excellent.

The rotor may be also processed by casting. In this case, by various casing methods, such as sand pattern, core, outer mold, lost form, and lost wax, a hollow rotor having protruding portion can be formed easily.

DETAILED DESCRIPTION OF THE PREFERRED EMBODIMENTS

Figure 1:
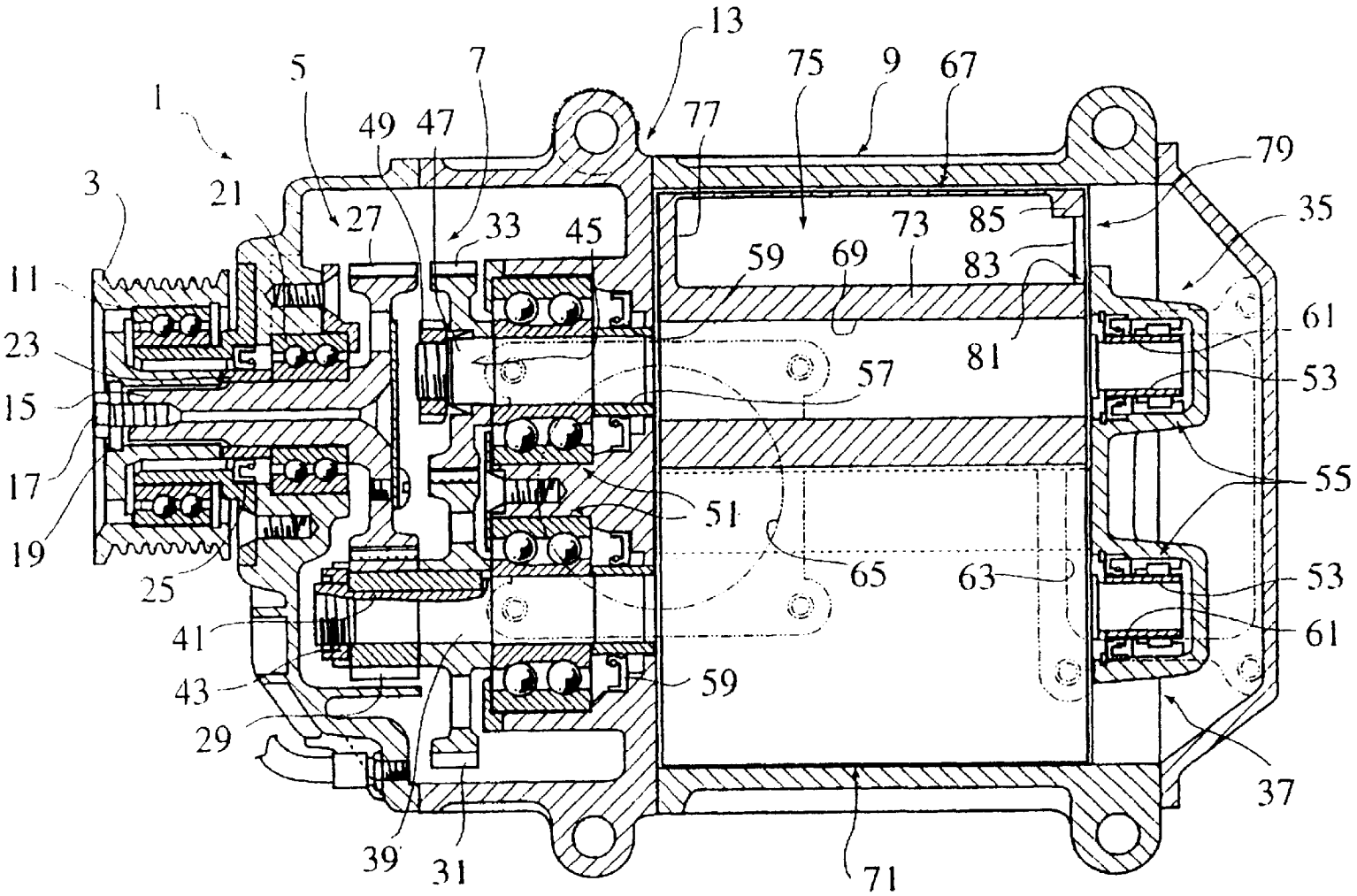
FIG. 1 is a sectional view showing a first embodiment of the invention.
Figure 2:
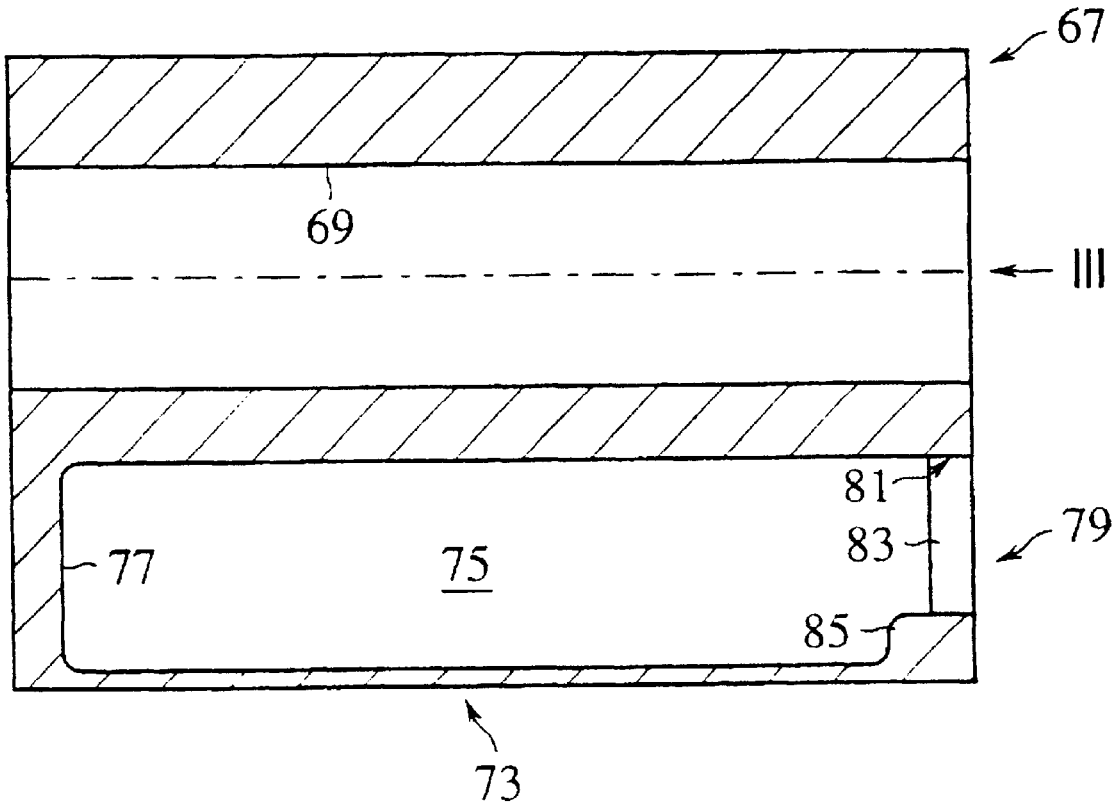
FIG. 2 is a sectional view of II—II in FIG. 3, showing a male screw rotor 35.
Figure 3:
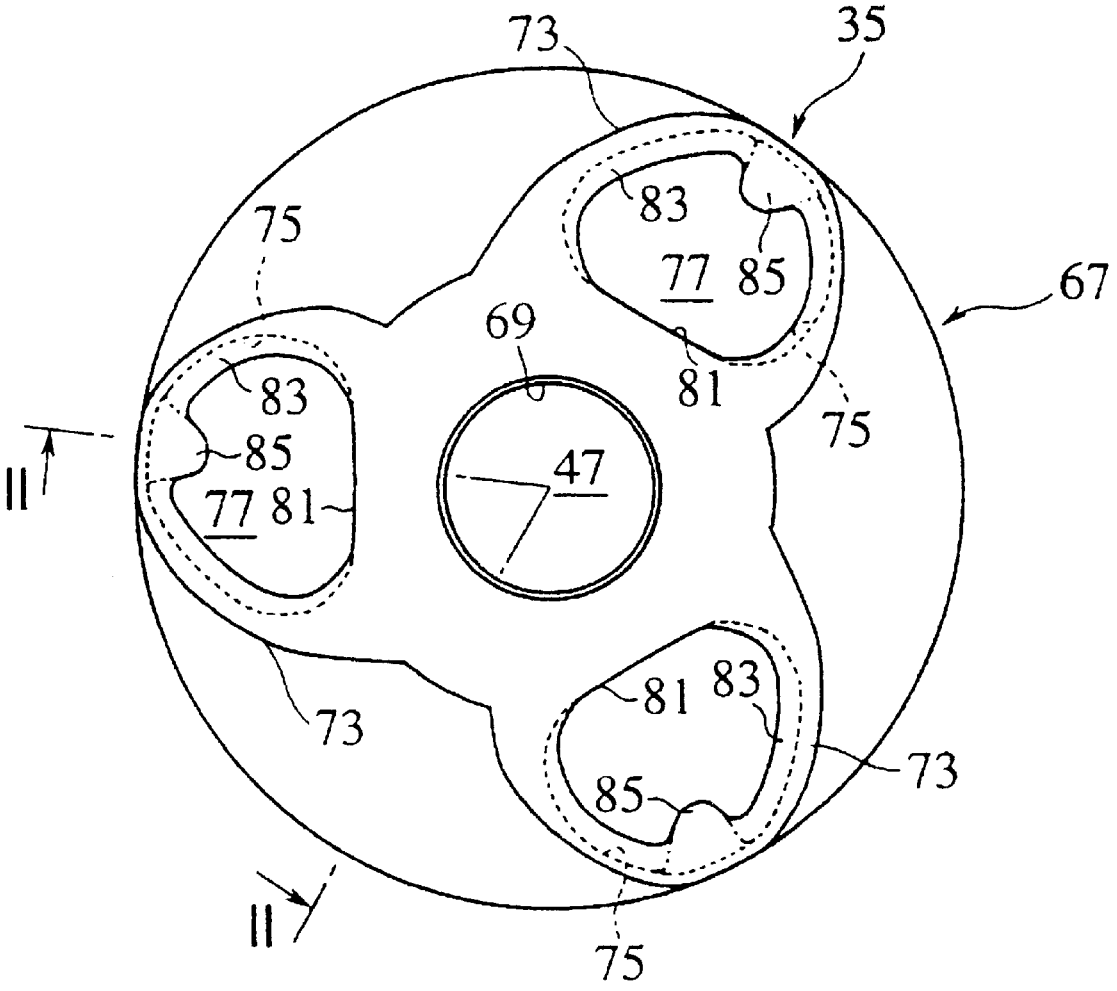
FIG. 3 is a view of arrow III in FIG. 2, showing an end portion of the male screw rotor 35.

A first embodiment of the invention is described while referring to FIG. 1 to FIG. 3. FIG. 1 shows a supercharger 1 according to this embodiment. The lateral direction is the lateral direction in FIG. 1 and FIG. 3, and members not identified with reference numerals are not shown in the drawings.

As shown in FIG. 1, the supercharger 1 is composed of an input pulley 3 a, speed-up gear set 5, a timing gear set 7 and a screw type compressor 9(a fluid machine in the embodiment).

The input pulley 3 is borne on a compressor casing 13 by a bearing 11, and is spline-coupled to an input shaft 15. Pulley 3 is fixed with a bolt 17 and a washer 19. The input pulley 3 is coupled to the crankshaft side pulley through a belt, and an electromagnetic clutch is disposed in the crankshaft side pulley, thereby connecting and disconnecting the engine and supercharger 1. In this way, the input pulley 3 is rotated and driven through this electromagnetic clutch by the driving force of the engine.

The input shaft 15 is borne inside of the casing 13 through a ball bearing 21. A seal 25 is disposed between a collar 23 and a casing 13 fitted on the input shaft 14 in order to prevent oil leak.

The speed-up gear set 5 is composed of mutually engaged large and small speed-up gears 27, 29, and the timing gear set 7 is composed of mutually engaged large and small timing gears 31, 33. The air compressor 9 comprises male and female screw rotors 35, 37.

The large speed-up gear 27 is integrally formed at the right end of the input shaft 15, and the small speed-up gear 29 is coupled with a rotor shaft 39 of female screw rotor 37, together with the large timing gear 31, by means of a key 41, and is prevented from dropping out by a nut 43. The small timing gear 33 is coupled to a rotor shaft 47 of male screw rotor 35 through a power lock mechanism 45.

Power lock mechanism 45 engages the timing gear 33 with the timing gear 31, while the screw rotors 35, 37 are not contacting with each other, and locks by tightening a nut 49. Mechanism 45 positions the screw rotors 35, 37 in the rotating direction.

The rotor shafts 47, 39 of the screw rotors 35, 37 are borne on the casing 13 by a ball beating 51 at the left end, and by a collar 53 and a roller bearing 55 at the right end. A seal 59 is disposed between the collar 57 and casing 13 provided at the left end of the rotor shafts 39, 47, and a seal 61 is disposed between the collar 53 and casing 13 at the right end, thereby preventing leak of lubricant.

The driving force of the engine entering through the pulley 3 is accelerated by the speed-up gear set 5, and rotates and drives the screw rotors 35, 37 through the timing gear set 7. The driven compressor 9 pumps out the fluid inhaled from the suction port 63 (flow inlet) to the left side in the axial direction between the screw rotors 35, 37, and discharges from a discharge port 65 (flow outlet) and supplies into the engine.

The screw rotor 35 is composed by fixing the rotor shaft 47 in a shaft hole 69 of the rotor main body 67. The screw rotor 37 is also composed by fixing the rotor shaft 39 in the shaft hole of the rotor main body 71.

Figure 4:
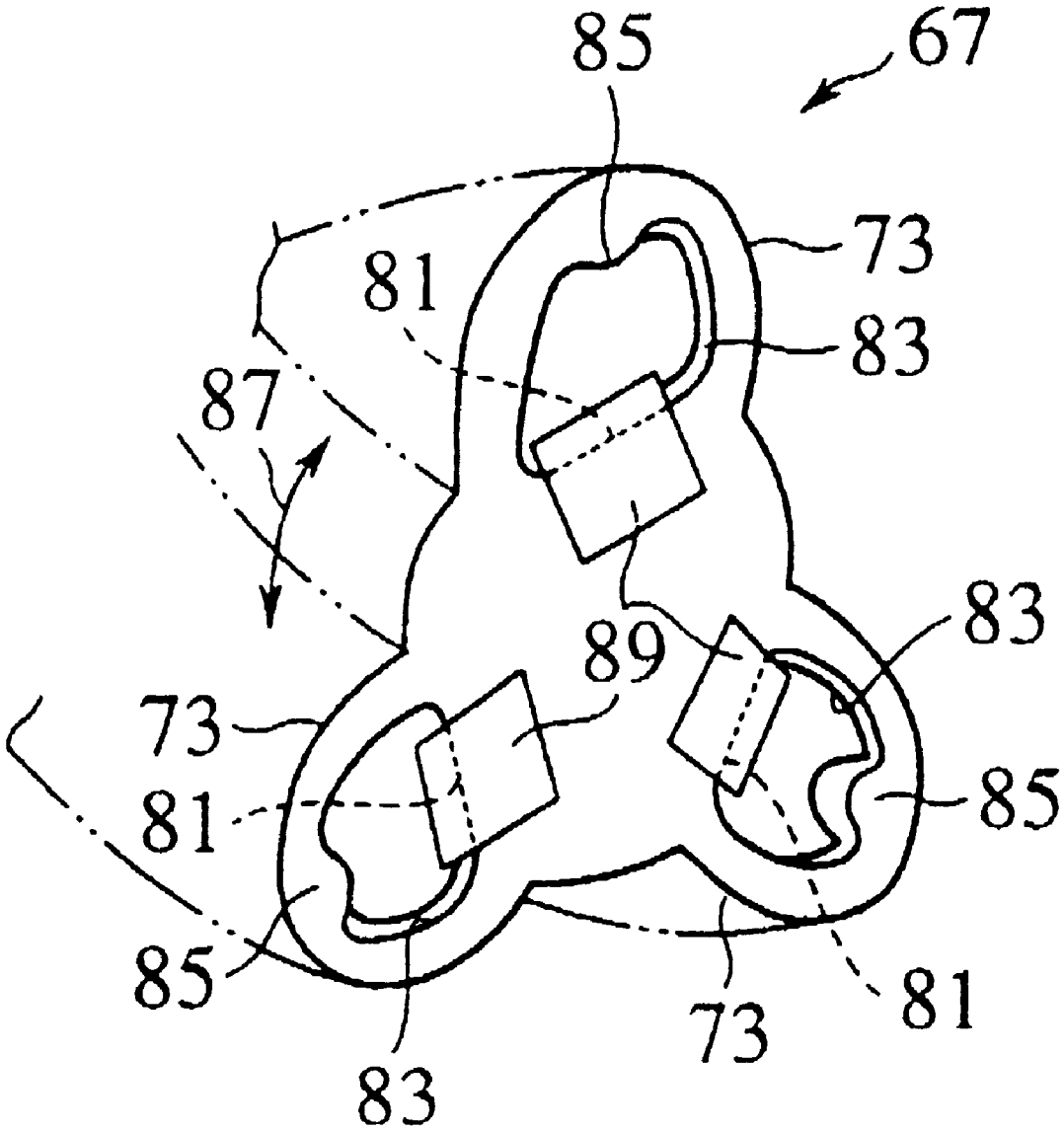
FIG. 4 is a perspective view showing the male screw rotor 35 with the end portion being chucked.

As shown in FIGS. 2, 3 and 4, the rotor main body 67 of the male screw rotor 35 has three protrusions 73 of screw shape. The rotor main body 71 of the female screw rotor 37 has four bulges of screw shape. These bulges define recesses therebetween. These rotor main bodies 67, 71 are aluminum casting.

A hollow space 75 is formed in each protrusion 73 of the male screw rotor 35. As shown in FIGS. 1 and 2, a wall 77 is provided at the left side of the hollow space 75, and an opening 79 is provided at the right side. In each opening 79, as shown in FIGS. 3 and 4, a straight portion 81, a rib 83, and a balancer 85 are formed. Hollow space 75 and opening 79 are formed at the time of casting by using a core having a straight portion at the inner circumferential side.

The left side wall 77 closes the hollow space 75, and prevents pressure leak between the discharge side and suction side of the compressor 9. The rib 83 reinforces the opening 79, and prevents swelling of the protrusions 73 due to centrifugal force, and mutual contacts of the screw rotors 35, 37 or contact of the screw rotor 35 and casing 13 due to this swelling. The balancer 85 keeps balance with the left side wall 77 during rotation to prevent vibration.

The straight portion 81 is formed at the inner circumferential side of each protrusion 73, and is provided for chucking of the cutting machine. As shown in FIG. 3, the protrusions 73 are formed at equal intervals at an angle of 120° mutually. Each hollow space is located at a balanced position of rotation on the rotor main body 67. Therefore, as indicated by arrow 67 in FIG. 4, when the rotor main body 67 is rotated, the straight portion 81 of each protrusion 73 can be chucked at a uniform contact by three chuck tools 89 disposed at mutual angle of 120°.

The shaft hole 69 and protrusions 73 of the rotor main body 67 are processed in such state of chucking the straight portions 81. Therefore, the protrusions 73 (tooth profile and hollow spaces 75) and the shaft hole 69 are aligned precisely, and the balance of rotation of the screw rotor 35 is adjusted simply by fixing the rotor shaft 47 in the shaft hole 69.

Since the screw rotor 35 is balanced, the supercharger 1 is lowered in vibration, the durability of the bearings 51, 55 is greatly enhanced, and mutual contact of the screw rotors 35, 37 and contact of the screw rotor 35 and casing 13 are prevented, so that the function and performance are kept normal.

The screw rotor 35 of hollow structure is lightweight, has an extremely small moment of inertia, and is also superior in rotation balance. Therefore, a vehicle mounting the supercharger 1 has improved fuel economy and acceleration response. In the event of sudden acceleration or deceleration (when starting and stopping the supercharger 1), mutual contact of the screw rotors 35, 37 is prevented. Moreover, the electromagnetic clutch for connecting and disconnecting the engine and supercharger 1 can be reduced in size.

In this way, the screw rotor 35 is basically balanced in rotation by chucking the straight portion 81 when cutting. Balance correction is not necessary, or if necessary, only a very slight correcting extent and correcting expense is required.

In addition, in the cast hollow rotor forming the hollow space 75 by a core, such as the screw rotor 35, misalignment of the core position and rotor shaft 47 largely affects the balance of rotation. However, according to the invention, since all misalignments are prevented, the balance correcting cost is eliminated.

Moreover, by casting process, a hollow screw rotor 35 of complicated shape can be easily processed. It is possible to manufacture at a lower cost as compared with other processing method.

Since the straight portion 81 for chucking is formed entirely in the axial direction of the hollow space 75 by the straight portion of the core, if the end portion of the rotor main body 67 is cut off as required, it does not cause misalignment of the straight portion 81 and rotor shaft 47.

In a screw conveyor 9 generally used at higher rotating speed than the Roots type fluid machine using a rotor of cocoon shaped section that is more susceptible to effects of vibration or the like due to imbalance, the invention is advantageous because a screw rotor 35 with good rotation balance is obtained.

Thus, a screw rotor 35 free from misalignment in hollow structure is obtained.

Also it should be understood, the hollow rotor may be manufactured by plastic processing such as extraction and extrusion, in addition to casting process.

Referring next to FIGS. 5, 6, 7, 8, and 9, a second embodiment of the invention is described below. In these drawings, the same parts as in FIGS. 1, 2, 3, and 4 are identified with same reference numerals, and duplicate explanations are omitted.

Figure 5:
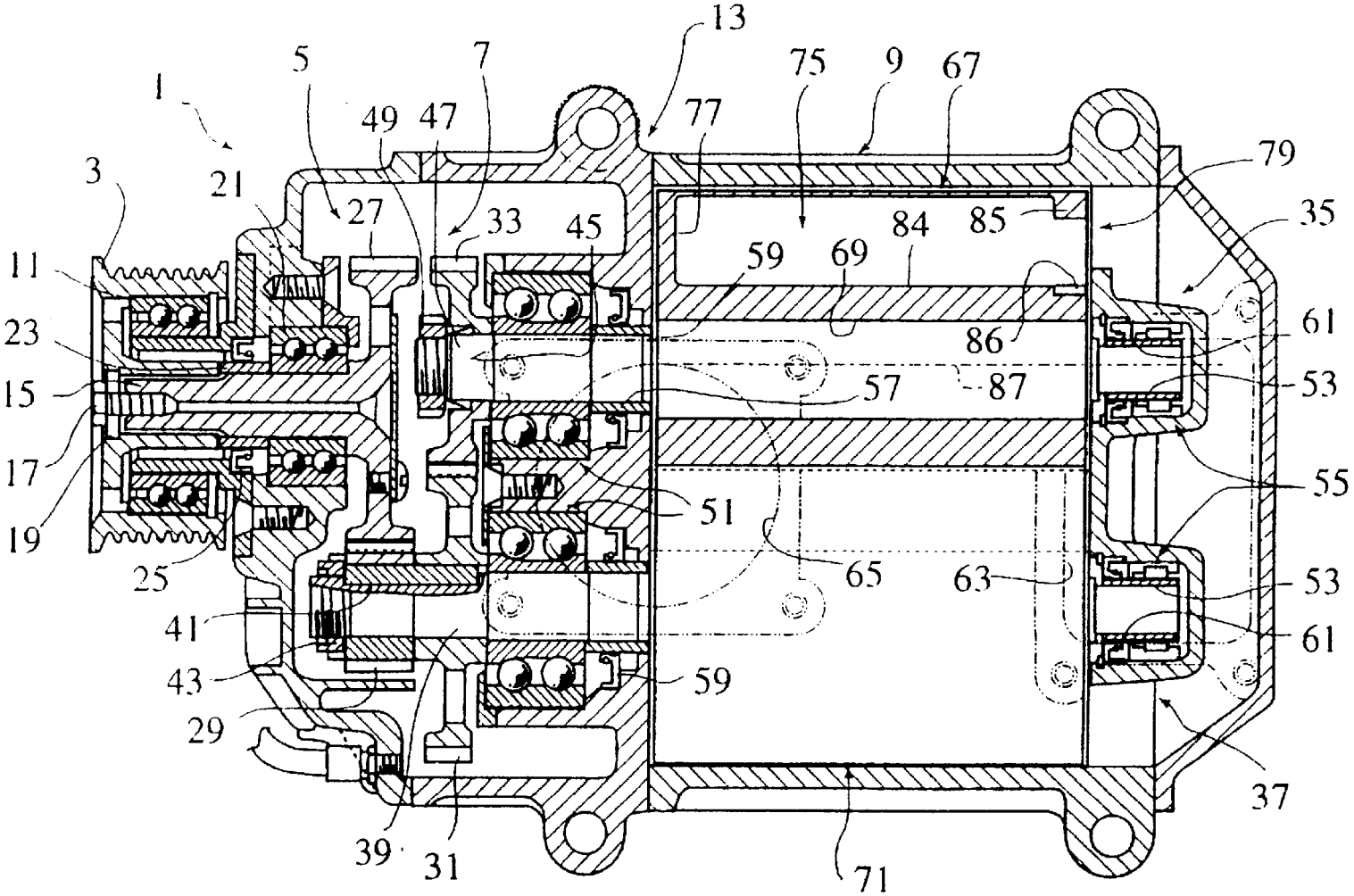
FIG. 5 is a sectional view showing a second embodiment of the invention.
Figure 7:
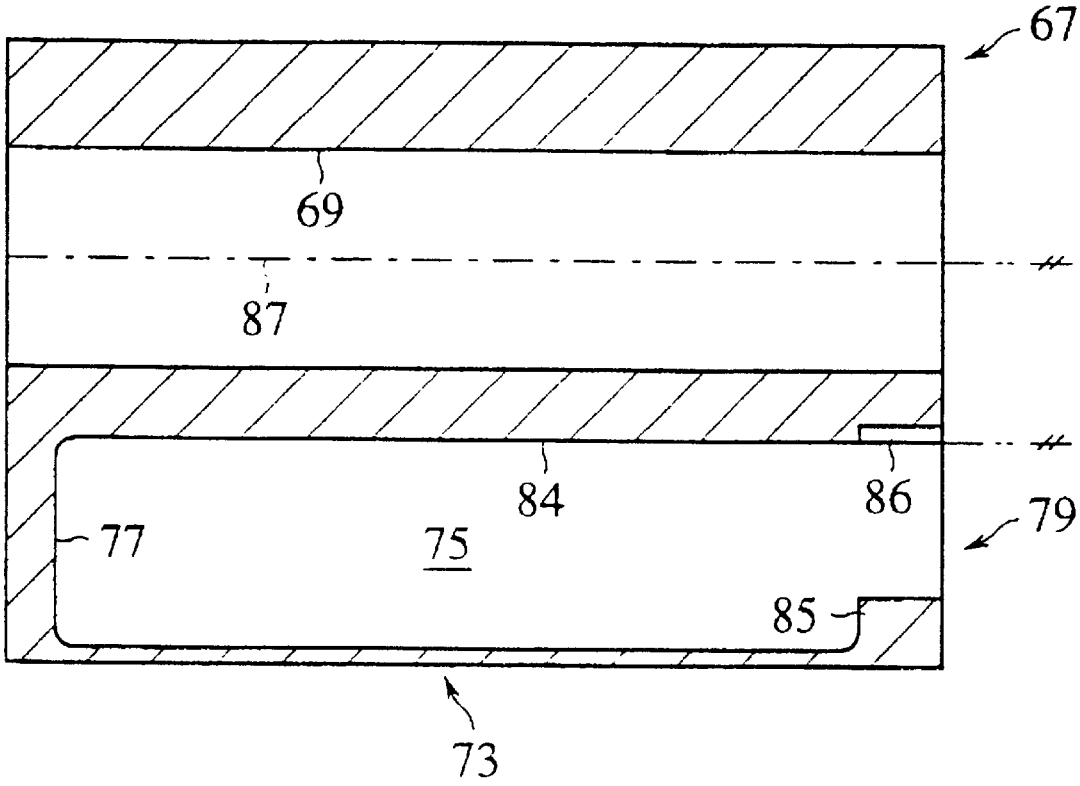
FIG. 7 is a sectional view of the male screw rotor cut off along the protrusion, in section VII—VII in FIG. 6.
Figure 8:
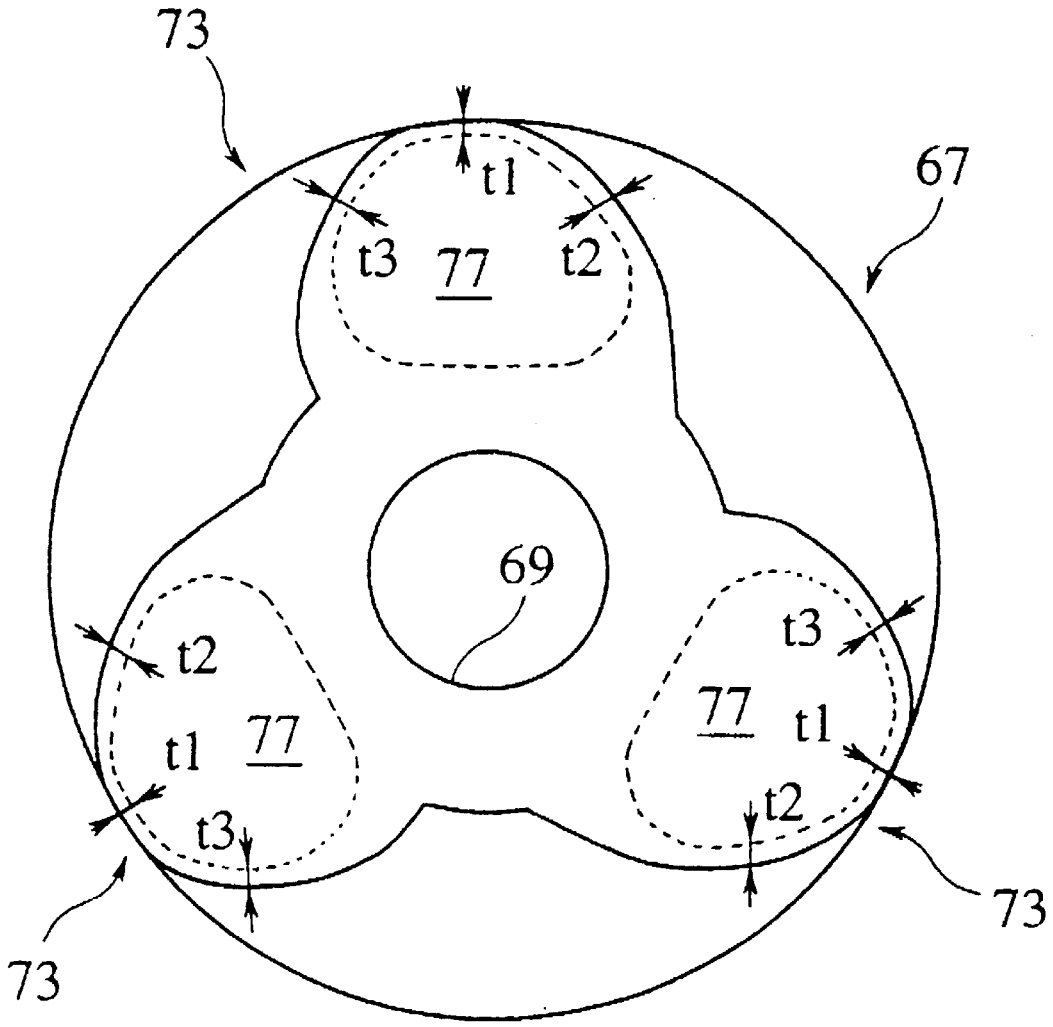
FIG. 8 is a wall side end view of the male screw rotor used in the second embodiment.

In this embodiment, each protrusion 73 of the male screw rotor 35 is disposed at equal intervals in the circumferential direction, and a hollow space 75 is formed in each protrusion 73. As shown in FIGS. 5 and 7, a wall 77 is formed at the left side of the hollow space 75, and an opening 79 is provided at the right side. The wall 77 closes the hollow space 75, and prevents pressure leak between the discharge side and suction side of the compressor 9.

Figure 6:
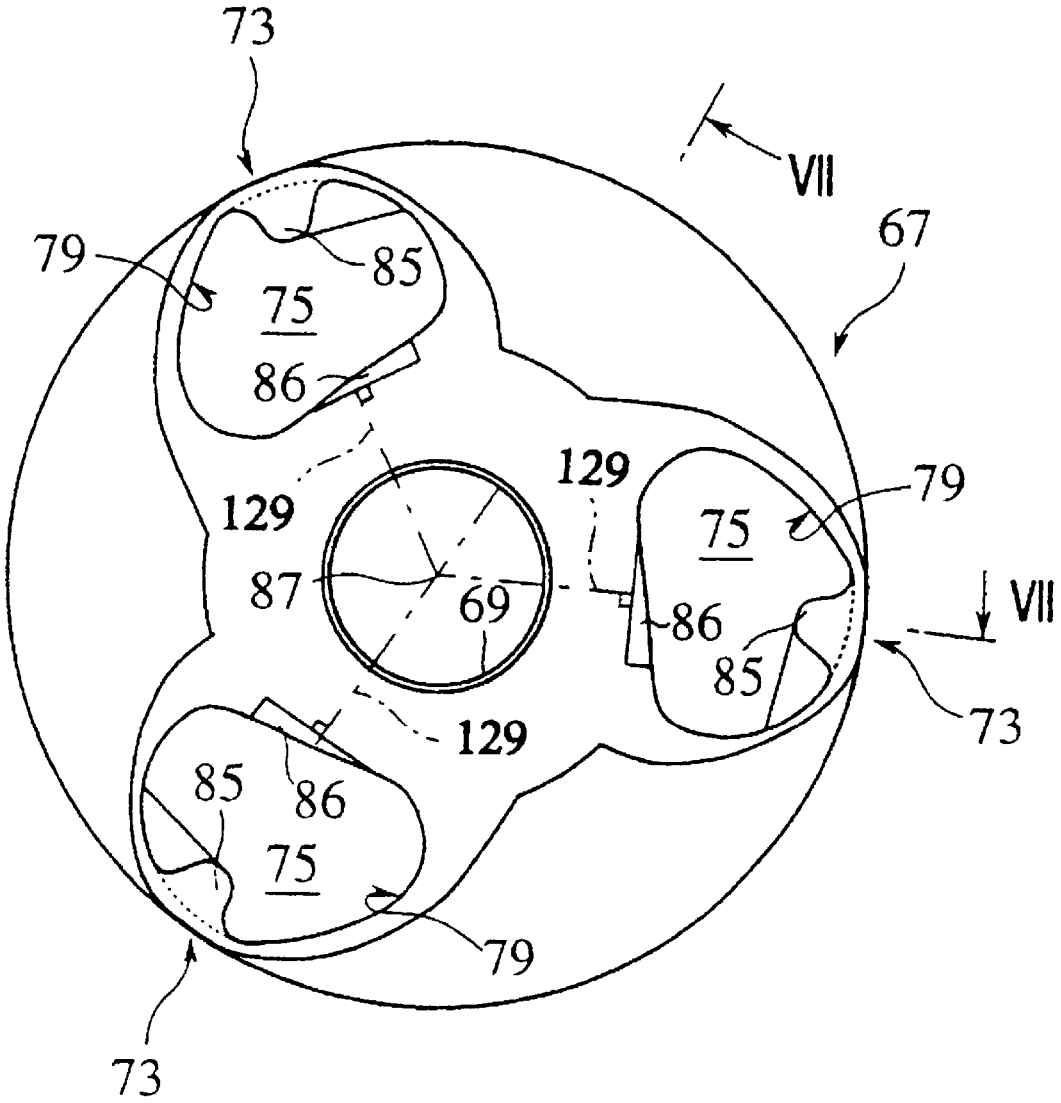
FIG. 6 is an opening side end view of a male screw rotor used in the second embodiment.

As shown in FIGS. 5, 6, and 7, a bulge 85 for keeping balance is provided in each opening 79, and a flat plane 86 is formed near each opening 79. The bulge 85 keeps rotation balance with the left side wall 77, and prevents vibration of rotation of the screw rotor 35.

Figure 9:
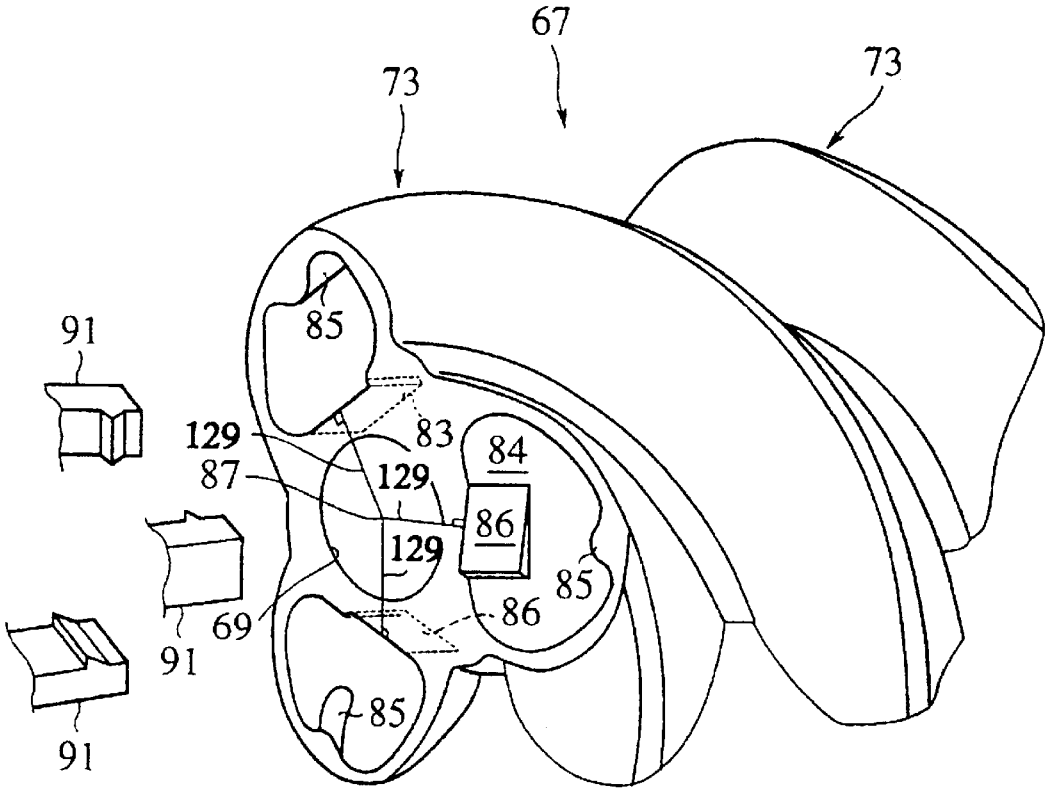
FIG. 9 is a perspective view showing the opening side end portion of the male screw rotor and chuck tool used in the second embodiment.

The flat plane 86 is provided at the bottom 84 (the rotation center 87 side of the hollow space 75) side of each hollow space 75, and is formed vertically to the normal 129 about the center of rotation 87 of the rotor main body 67 as shown in FIGS. 6 and 9.

These hollow spaces 75, walls 77, openings 79, bulges 85, and flat planes 86 are formed by using the core at the time of casting the rotor main body 67.

Each flat plane 86 is provided for chucking at the time of machining the rotor main body 67 after casting, and is formed vertically to the normal 129 as described below. Therefore, as shown in FIG. 9, the rotor main body 67 is firmly and securely fixed only by gripping with three chuck tools 91. Thus, the tool and the rotor main body 67 can be positioned accurately on the cutting machine.

It is therefore possible to accurately synchronize the rotating speed of the rotor main body 67, and the feed rate of the tool in the radial direction and axial direction by the cutting machine. The shape of the protrusions 73 of screw shape can be processed precisely. Therefore, the parts are processed in uniform thickness t1, t2, t3 (see FIG. 8) among the three protrusions 73.

Machining of the shaft hole 69 can be done together with machining of the protrusions 73 in the state of chucking the flat plane 86, and the alignment of the protrusions 73 (tooth profile) and shaft hole 69 can be done precisely, and therefore only by fixing the rotor shaft 47 in the shaft hole 69, basically, the rotation balance of the screw rotor 35 is adjusted.

Hence, in the rotor main body 57 of the screw rotor 35 processed in this way, the balance of rotation is extremely excellent. Occurrence of vibration during rotation can be prevented.

The second embodiment, in addition to the effects of the first embodiment, further brings about the following effects.

The screw rotor 35 is basically adjusted in balance of rotation only by the cutting process. Balance correction is not necessary, and if needed, it requires only a very slight correcting extent and correcting expense. The balance is corrected by drilling a hole, if necessary, in the balancing bulge 85 for three protrusions 73 in the axial direction from the rotor end side.

Since a plane close to a flat plane is initially formed in the bottom 84 of the hollow space 75, by forming the flat plane 86 in this bottom 84, the flat plane 86 can be formed sufficiently widely. Therefore, the flat plane 86 itself can be chucked firmly, and the machining precision is further enhanced, and great effects are obtained in prevention of vibration and improvement of reliability of the supercharger 1.

In addition, when forming the rotor main body 67 by casting, if cast by any method, including a method of using sand pattern, lost form method, and lost wax method, a flat plane 86 is obtained at the time of casting. It is not necessary to machine the flat plane 86, so that it can be executed at lower cost. In this way, the flat plane as the standard for processing is obtained by casting, which is very convenient for processing the rotor main body 67 after casting.

According to the casting process, a hollow screw rotor 35 of complicated shape can be easily processed. Thus, it is possible to manufacture at lower cost than in other processing methods.

Unlike the laminate structure prior art, the invention is free from deviation in the axial length and tooth profile due to fluctuations of gap or thickness of laminates. Product reliability is notably enhanced, and the invention is also liberated from the huge processing cost of laminates, a tremendous number of parts, and enormous manpower for control.

In the screw conveyor 9 generally used at higher rotating speed than a Roots type fluid machine using a rotor of cocoon shaped section that is more susceptible to effects of vibration or the like due to imbalance, the invention is advantageous because the screw rotor 35 of good balance in rotation is obtained.

A third embodiment of the invention is described below by reference to FIG. 10 and FIG. 11.

In the description of the third embodiment, members of same functions as in the second embodiment are cited by referring to the same reference numerals, and duplicate explanations of members of same functions are omitted. Incidentally, the lateral direction is the lateral direction as shown in FIG. 10, and members not provided with reference numerals are not shown in the drawings.

The fluid machine of the third embodiment is, like the fluid machine in the second embodiment, used in the supercharger as screw compressor. The engine drive force is put in from the crankshaft side pulley through the electromagnetic clutch, and is accelerated by the speed-up gear set, and drives the screw conveyor of the third embodiment through the timing gear set.

This screw compressor is composed of a male screw rotor (male rotor) and a female screw rotor (female rotor). The male screw rotor is composed by fixing a rotor shaft in a shaft hole 95 of a rotor main body 93 shown in FIG. 10. The female screw rotor is similarly composed by fixing a rotor shaft in a shaft hole of a rotor main body.

Figure 10:
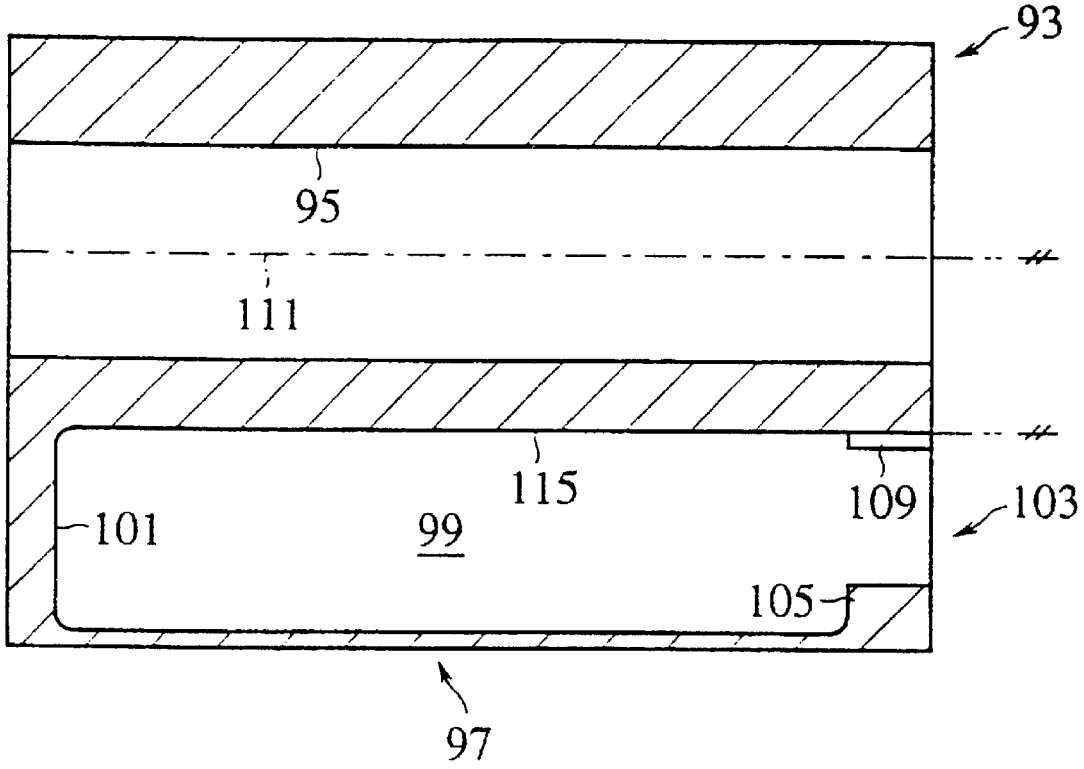
FIG. 10 is a sectional view of a male screw rotor cut off along the protrusion used in a third embodiment of the invention, in section X—X in FIG. 11.
Figure 11:
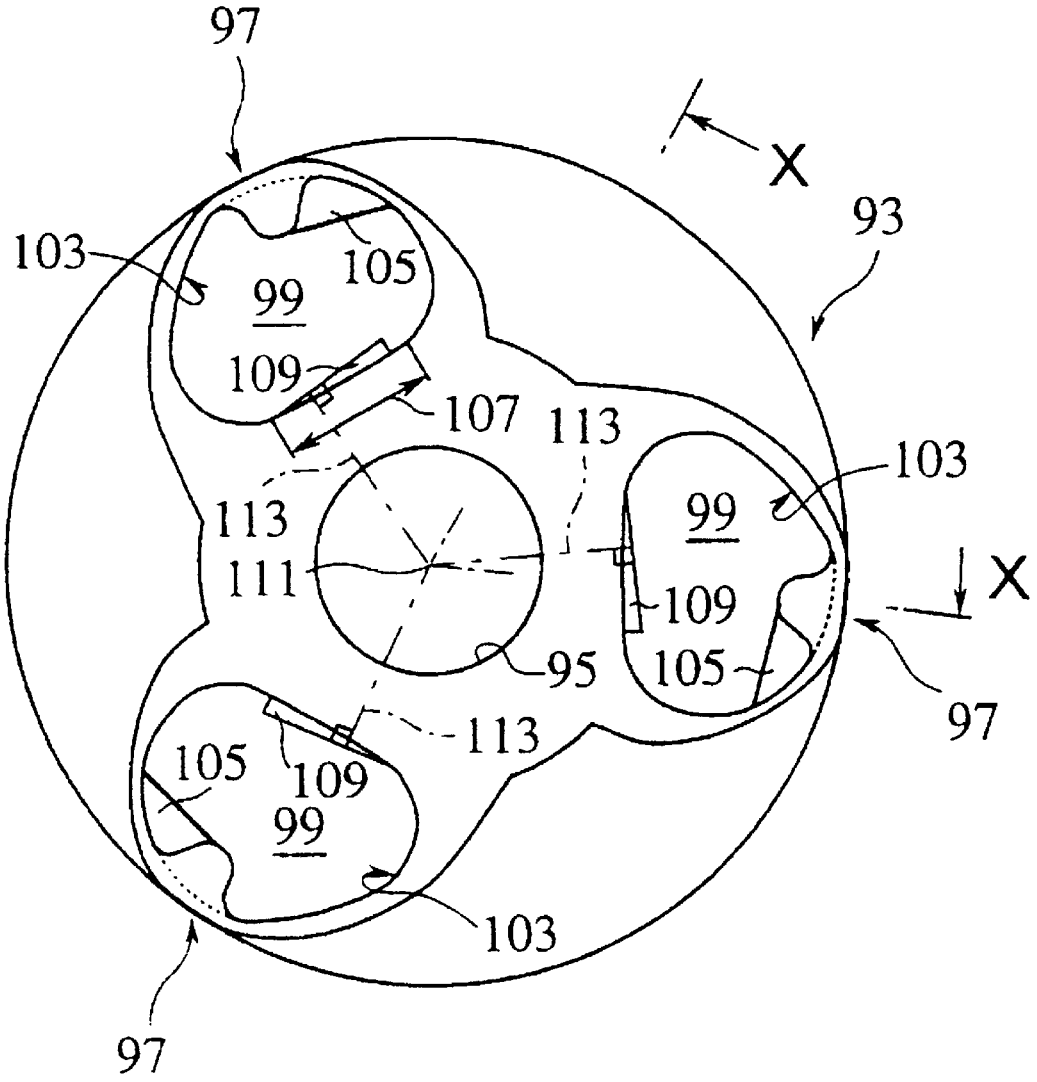
FIG. 11 is an opening side end view of the male screw rotor used in the third embodiment.
Figure 12:
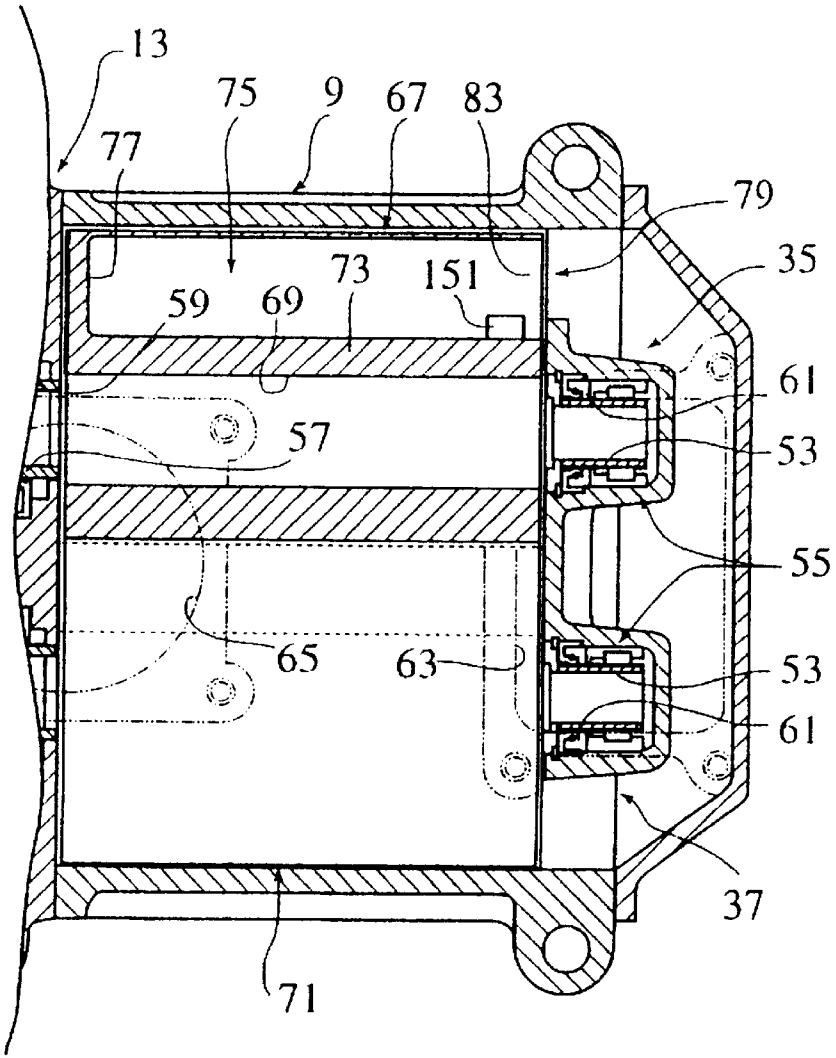
FIG. 12 is a sectional view showing a fourth embodiment of the invention.
Figure 13:
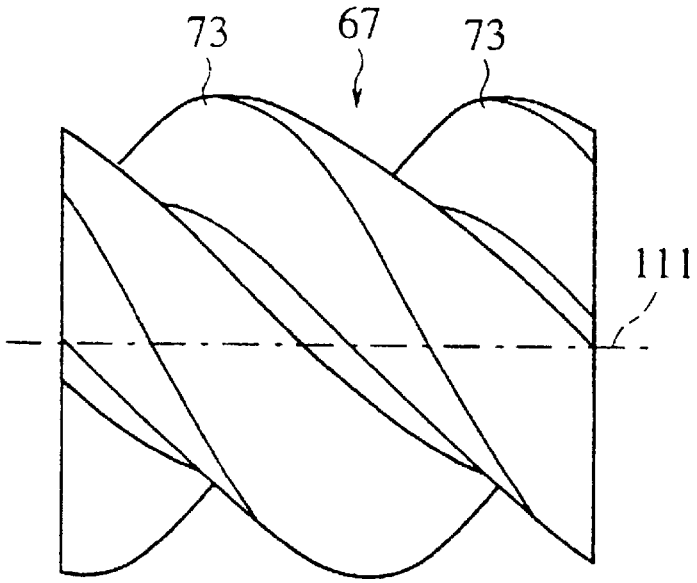
FIG. 13 is an appearance diagram showing a rotor main body in the fourth embodiment.

As shown in FIG. 11, the rotor main body 93 has three protrusions 97 of screw shape, and each protrusion 97 is disposed at equal interval. A hollow space 99 is formed in each protrusion 97, and a wall 101 is provided at the left side of the hollow pan 99 as shown in FIG. 10, and an opening 103 is provided at the right side. The wall 101 closes the hollow space 99, and prevents pressure leak between the discharge side and suction side of the compressor.

In each opening 103, a bulge 105 for keeping balance is provided. Balance of rotation is kept with the left side wall 101, thereby preventing vibration during rotation of the screw rotor. The balance correcting method is the same as in the second embodiment.

Also in each opening 103, a straight portion 107 is provided as indicated by arrow in FIG. 11, and near each opening 103, a flat plane 109 is processed in the axial direction by reference to this straight portion 107.

Each flat plane 109 is processed vertically to the normal 113 about the center of rotation 111 of the rotor main body 93, and is formed at the bottom 115 side of each hollow space 99 (the side of center of rotation 111 of the hollow space 99) as shown in FIG. 10.

These flat planes 109 are provided for chucking when finishing the rotor main body 93 after rough machining, and being formed vertically to the normal 113 as mentioned above, only by gripping with three chuck tools, the tool and the rotor main body 93 can be positioned accurately on the cutting machine.

It is therefore possible to synchronize the rotating speed of the rotor main body 93 and the feed rate in the radial direction and axial direction of the tool by the cutting machine, and the shape of the protrusions 97 of screw shape can be processed precisely, and the parts of the three protrusions 97 are formed in a uniform thickness.

Machining of the shaft hole 95 can be done together with machining of the protrusions 97 in the state of chucking the flat plane 109, and the alignment of the protrusions 97 (tooth profile) and shaft hole 95 can be done precisely. Therefore, only by fixing the rotor shaft in the shaft hole 95, basically, the rotation balance of the screw rotor is adjusted.

Hence, in a rotor main body 93 made in this way, the balance of rotation is extremely excellent, and occurrence of vibration during rotation can be prevented.

The supercharger is thus free from imbalance of the screw rotor, hence extremely small in vibration during rotation, and the durability of the beating for supporting the screw rotor is notably enhanced. Mutual contact of the screw rotors and contact of the screw rotor and compressor casing can be prevented, so that the function and performance are kept normal.

The screw rotor of hollow structure is light in weight and has an extremely small moment of inertia. Therefore a vehicle mounting the supercharger has improved fuel economy, response in acceleration, and, also owing to the excellent balance in rotation as mentioned above, in the event of sudden acceleration or deceleration (when starting and stopping the supercharger 1), mutual contact of the screw rotors can be prevented. Moreover, the electromagnetic clutch for connecting and disconnecting the engine and supercharger can be reduced in size.

In this way, this male screw rotor is basically balanced in rotation by a cutting process. Therefore, balance correction is not necessary, and if necessary, only a very slight correcting extent and correcting expense is required.

Furthermore, by forming the flat plane 109 in the bottom 115 close to a plane, the flat plane 109 can be formed sufficiently wider. By secure chucking, the processing precision is heightened, and it brings about greater effects in prevention of vibration of supercharger, and improved reliability.

In addition, in the rotor main body 93, the bottom 115 of the hollow space 99 has the straight portion 107. This straight portion 107 can be utilized as the reference straight line, so that the processing of the flat plane 109 may be more accurate, and the processing precision of the screw rotor is further enhanced.

Unlike the laminate structure prior art, moreover, the invention is free from deviation in the axial length and tooth profile due to fluctuations of gap or thickness of laminates, and product reliability is notably enhanced. Also the invention is liberated from the huge processing cost of laminates, a tremendous number of parts, and enormous manpower for control.

In the fluid machine of the invention, the wall formed in the hollow space of the rotor main body may be formed in the middle part, not limited to the end. Openings may be provided at both ends, or moreover, without a forming wall, it may be designed to penetrate in the axial direction. Also, the flat plane may be provided near the opening.

In the case of a female rotor, the invention is executed by forming hollow spaces in the bulges formed between concave teeth, and forming a flat plane near the opening.

Also, the rotor may be manufactured by plastic processing such as extraction and extrusion, aside from casting process. The fluid machine of the invention may be used, not only as compressor or blower, but also as motor for picking up rotation by applying a fluid pressure.

Referring finally to FIGS. 12, 13, 14, and 15, a fourth embodiment of the invention is described below. In these drawings, the same components as in FIGS. 1, 2, 3, and 4 are identified with same reference numerals, and duplicate explanations are omitted.

A rotor main body 67 has three protrusions 73 of screw shape. Each protrusion 73 is disposed mutually at equal interval. In each protrusion 73, a hollow space 75 is formed, and a wall 77 is provided at one end of the hollow space 75, and an opening 83 at the other end.

At the opening 83 side of the hollow space 75, a protruding portion 151 is formed to protrude from the side of center of rotation of the rotor main body 67 to the outward side in the radial direction. Each protruding portion 151 has a radial direction defining plane 151a at its peak, an axial direction defining plane 151b at its end in the axial direction, and a rotating direction defining plane 151c at its end in the rotating direction.

The radial direction defining plane 151a is processed vertically to the normal 113 about the center of rotation of the rotor main body 67, is as the flat plane 109 in FIG. 11 relating to the third embodiment. Accordingly, as shown in FIGS. 14 and 15, it is possible to grip easily by three chuck tools 153.

Each chuck member 153 abuts against the radial direction defining plane 151b to define the motion of the rotor main body 67 in the axial direction. Each chuck member 153 also fits into the rotating direction defining plane 151c to define the motion of the rotor main body 67 in the rotating direction.

Figure 14:
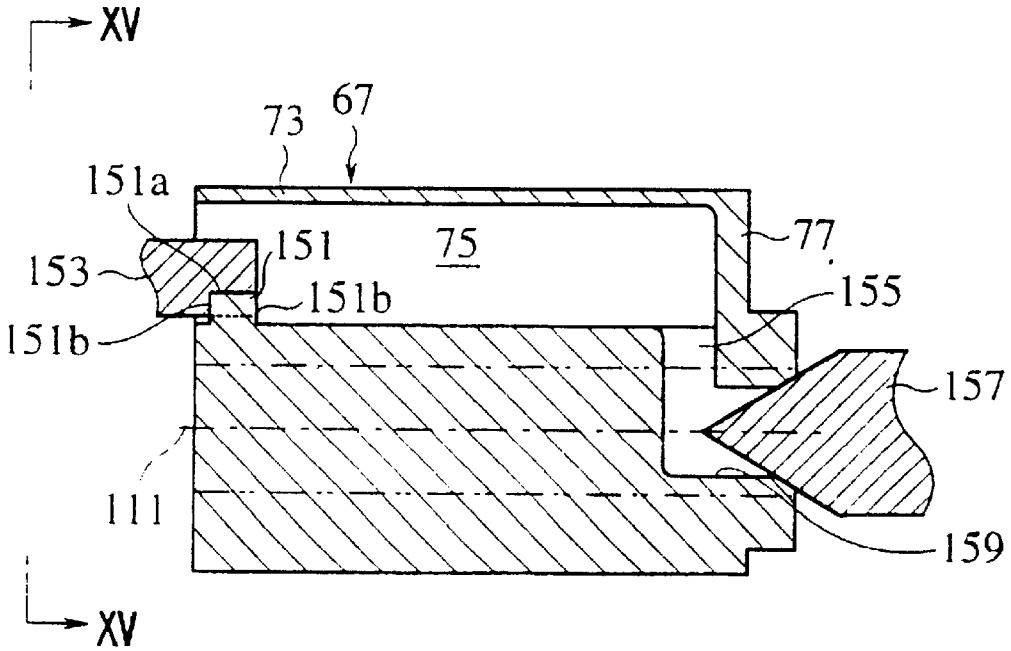
FIG. 14 is a sectional view of XIV—XIV of the rotor main body in FIG. 15, showing the state of supporting the rotor main body with a chuck tool when processing the rotor main body.
Figure 15:
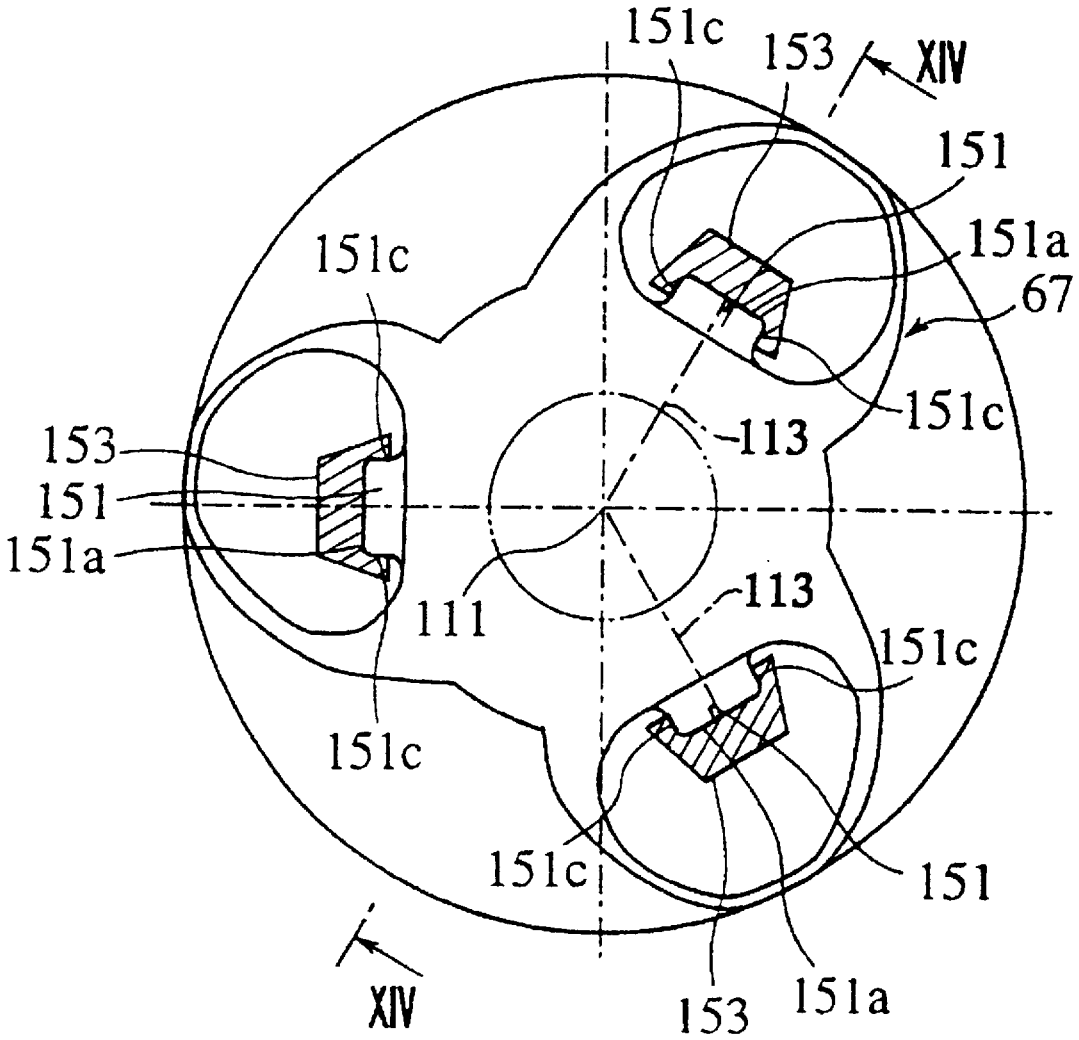
FIG. 15 is a view along line XV—XV in FIG. 14.

When processing the rotor main body 67, as shown in FIG. 14, a center chuck member 157 is inserted into a center hole 159 for processing communicating with a core print hole 155 formed at the wall 77 side. The core print hole 155 is closed after processing the rotor main body 67.

Thus, according to this embodiment, by only gripping the protruding portion 151 by the chuck tool 153, the cutting tool and the rotor main body 67 can be positioned accurately on the cutting machine.

It is therefore possible to synchronize the rotating speed of the rotor main body 93 and the feed rate in the radial direction and axial direction of the tool by the cutting machine. The shape of the protrusions 97 of screw shape can be processed precisely, and the parts of the three protrusions 97 are formed in a uniform thickness.

Machining of the shaft hole 95 can be done together with machining of the protrusions 97 in the state of chucking the flat plane 109. The alignment of the protrusions 97 (tooth profile) and shaft hole 95 can be done precisely. Therefore, only by fixing the rotor shaft in the shaft hole 95, basically, the rotation balance of the screw rotor is adjusted.

Hence, in the rotor main body 93 processing the screw rotor in this way, the balance of rotation is extremely excellent, and occurrence of vibration during rotation can be prevented.

In addition, the same effects as mentioned in the first to third embodiments are also obtained.

Preferred embodiments of this invention have been disclosed. However, a worker of ordinary skill in the art would recognize that certain modifications would come within the scope of this invention. Thus, the following claims should be studied to determine the true scope and content of the invention.

What is claimed is:

1. A fluid machine comprising:

a male rotor composed of a rotor main body having plural screw-shaped protrusions, and a rotor shaft fixed in a shaft hole formed in the center of rotation thereof;

a female rotor composed of a rotor main body having screw-shaped recesses formed between bulges to be engaged with the screw-shaped protrusions of the male rotor, and a rotor shaft fixed in a shaft hole formed in the center of rotation thereof;

a casing including said male rotor and female rotor rotatably, and having fluid inlet and outlet; and wherein a hollow space having an opening at least at the axial end is provided in at least one of the protrusions of the male rotor and bulges of the female rotor, and a straight portion to be chucked at the time of machining is formed at the inner circumferential side of the opening.

2. A fluid machine of claim 1, wherein at least one rotor is processed by casting.

3. A fluid machine comprising:

a male rotor composed of a rotor main body having plural screw-shaped protrusions, and a rotor shaft fixed in a shaft hole formed in the center of rotation thereof;

a female rotor composed of a rotor main body having screw-shaped recesses formed between bulges to be engaged with protrusions of the male rotor, and a rotor shaft fixed in a shaft hole formed in the center of rotation thereof; and a casing including said male rotor and female rotor rotatably, and having fluid inlet and outlet; and wherein a hollow space having an opening at least at the axial end is provided in at least one of the protrusions of the male rotor and bulges of the female rotor, and a plane portion for chucking at the time of machining is formed near the opening.

4. A fluid machine of claim 3, wherein the plane portion is formed vertically to the normal about the center of rotation of the rotor main body.

5. A fluid machine of claim 3, wherein the plane portion is formed on the surface on the side of center of rotation in the hollow space.

6. A fluid machine of claim 3, wherein a straight portion is formed on the side of center of rotation of the opening of the hollow space, and the plane portion is formed in the axial direction on the basis of this straight portion.

7. A fluid machine of claim 3, wherein at least one rotor is processed by casting.

8. A fluid machine comprising:

a male rotor composed of a rotor main body having plural screw-shaped protrusions, and a rotor shaft fixed in a shaft hole formed in the center of rotation thereof;

a female rotor composed of a rotor main body having screw-shaped recesses formed between bulges to be engaged with protrusions of the male rotor, and a rotor shaft fixed in a shaft hole formed in the center of rotation thereof;

a casing including said male rotor and female rotor rotatably, and having fluid inlet and outlet; and wherein a hollow space having an opening at least at the axial end is provided in at least one of the protrusions of the male rotor and bulges of the female rotor, and a protruding portion having a plane portion for chucking at the time of machining is formed near the opening.

9. A fluid machine of claim 8, wherein the protruding portion is formed on the surface on the side of center of rotation in the hollow space.

10. A fluid machine of claim 8, wherein the protruding portion has a rotating direction defining plane, a radial direction defining plane, and an axial direction defining plane for the rotor.

11. A fluid machine of claim 8, wherein the rotor is processed by casting.

* * * * *